Jan. 19, 1954  H. J. COLLINS  2,666,359
STEREOSCOPIC VIEWER
Filed Aug. 20, 1951  2 Sheets-Sheet 1
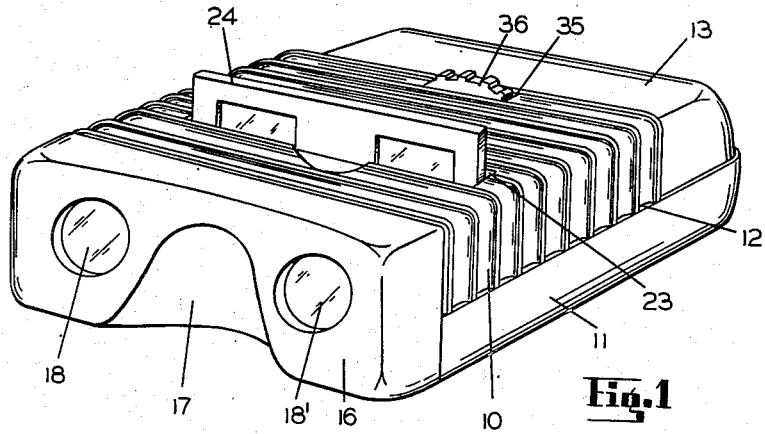
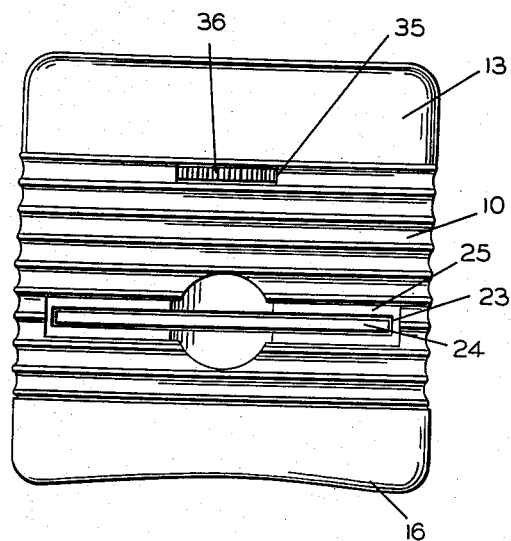
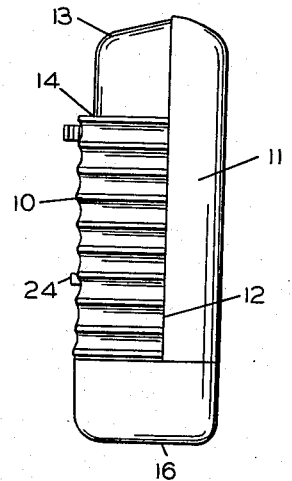
INVENTOR.
HARRY J. COLLINS
BY
*Christian D. Nielsen*
ATTORNEY.

Jan. 19, 1954   H. J. COLLINS   2,666,359
STEREOSCOPIC VIEWER
Filed Aug. 20, 1951   2 Sheets-Sheet 2
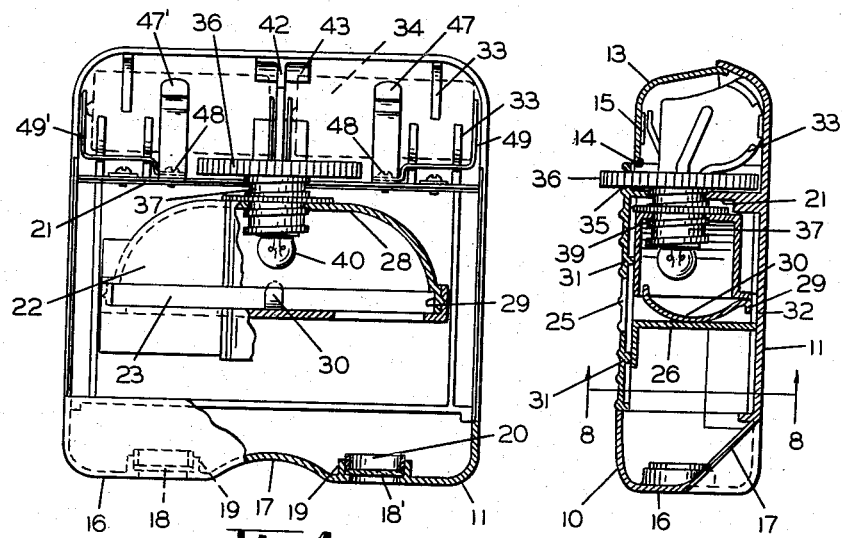
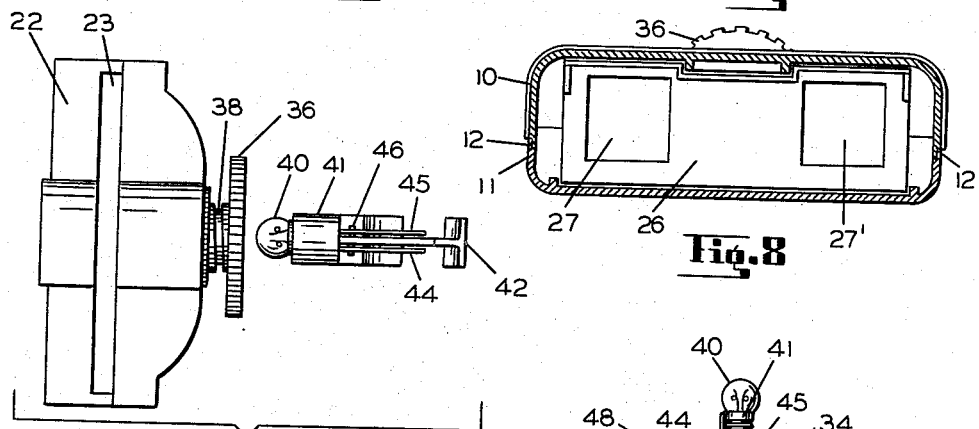
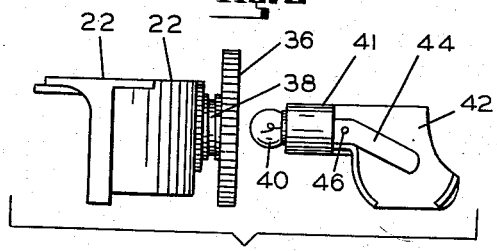
INVENTOR.
HARRY J. COLLINS
BY
Christian D. Nielsen
ATTORNEY.

Patented Jan. 19, 1954

2,666,359

UNITED STATES PATENT OFFICE 2,666,359

STEREOSCOPIC VIEWER

Harry J. Collins, Milwaukee, Wis., assignor to David White Company, Milwaukee, Wis., a corporation of Wisconsin Application August 20, 1951, Serial No. 242,651

5 Claims. (Cl. 88—29)

My invention relates to viewers, and more particularly to stereoscopic viewers that may be adjusted and focused for proper performance.

The object of my invention is to provide a stereoscopic viewer that has an adaptor for the picture slide within an enclosure, and means for slidably moving the adaptor within the enclosure.

Another object of my invention is to provide a device of the character described that has a rigid outer case forming an enclosure equipped with stationary lenses and stationary illuminating means, in which the slide is moved between the stationary lenses and the illuminating means.

A still further object of my invention is to provide a viewer that has a portion of the enclosure hingedly mounted in a resilient manner to permit actuating the illuminating means.

It is imperative to focus the stereoscopic slide acting as a mount for pictures within a viewer to obtain the most efficient results. This is usually accomplished by moving the lenses toward and away from the slides into which the picture is mounted, and is especially true when the slide is mounted into an adaptor enclosed in a viewer equipped with illuminating means and reflector.

The device as described, illustrated and claimed herein consists of a casing or enclosure which is rigid and maintains fixed overall dimensions. The lenses are mounted within its forward wall, while the illuminating means, reflector and batteries which form a source of current for the illuminating means, are all stationarily mounted within the enclosure, and the adaptor which supports the stereoscopic slide is moved forward and rearward within the enclosure, between the lenses and the illuminating means, thereby focusing the picture. This fixed dimension feature enables the entire unit to be placed into a carrying case or the like without changing the focusing equipment. The switch arrangement for illuminating means is actuated by applying pressure on a portion of the enclosure, thereby eliminating the necessity of locating a specific switch, push button, or the like.

The device is simple in construction, easy to manufacture, and positive in its performance.

Other and further objects of my invention will become apparent as the description proceeds, when taken in conjunction with the drawings in which:

Figure 1 is a perspective exterior view of the assembled viewer with a stereoscopic slide partially inserted therein.

Figure 2 is a top view of the device with the slides as shown in Figure 1.

Figure 3 is a side view of the device.

Figure 4 is a fragmentary cross-sectional view of the slide adaptor disposed within the lower section of the viewer, and showing the batteries in phantom.

Figure 5 is a longitudinal cross-sectional view of the assembled device without the batteries inserted therein.

Figure 6 is a composite top view of the illuminating means, in conjunction with a top view of the slide adaptor and its adjusting means.

Figure 7 is a composite side view of the arrangement as shown in Figure 6.

Figure 8 is a cross-sectional view of the device taken at the line 8—8 in Figure 5, and Figure 9 is a schematic plan view of the electrical illuminating circuit.

Similar characters of reference indicate corresponding parts throughout the several views, and referring now to the same, the character 10 shows the upper portion of a rectangular enclosure which may be made of plastic or the like. This upper portion 10 engages the lower portion 11 along a part of its outer wall as shown at 12. The upper portion 10 supports a separate section 13 which is hingedly supported at 14 to the upper portion 10. This section 13 may be constructed of metal, or it may have a metallic contact member 15 extending along its inner face.

The front wall 16 is recessed at its central portion 17, and supports lenses 18 and 18' mounted within the front wall 16, and held in place by the lens mounts 19, and supported by retaining rings shown as 20.

There is an inner wall 21 rearwardly disposed within the enclosure formed by the portions 10, 11 and 13, and an adaptor is shown as 22. This adaptor has a slot 23 within its upper face arranged for receiving the stereoscopic slide frame which the pictures are mounted on, and which frame is shown by the character 24. The upper portion 10 is also provided with a slot 25 which is wider and somewhat longer than the slot 23 of the adaptor 22, and is in direct alignment with the slot 23 thereby permitting the placing of the slides 24 through the slot 25 to engage the slot 23 in the adaptor 22. A front wall 26 of the adaptor 22 is provided with a pair of apertures 27 and 27' which may be rectangular or square placed therein, and a reflector wall 28 which is coated on the inside with a white covering, or the like, is shown as a part of the adaptor 22. This reflector wall 28 is shown arcuated or radial at its outer end.

The slot 23 in the adaptor 22 is recessed at 29 to receive the slide frame 24, and the inner face of the front wall 26 is provided with a leaf spring shown as 30 which is employed to support the slide frame 24 when inserted.

The adaptor 22 is slidably supported within the enclosure formed by the parts 10, 11 and 13, by means of surface guides 31 at the top, and a flat surface shown as 32 at the bottom. Rearward from the partition 31 are shown upwardly disposed ridges or flanges 33 which support the batteries 34 which, obviously, are dry cells employed to form a source of electric current.

The rearward upper face of the upper portion 10 is equipped with a slot 35 of a size and contour to receive the focusing disc 36 which extends therethrough, and which is serrated at its outer periphery, and forms an integral part of a tubular ferrule shown as 37 which is threaded on its outer peripheral face 38, for engagement within an aperture 39 in the reflector wall 28 of the adaptor. This ferrule 37 passes through an aperture in the wall 21 of the enclosure, and when the disc 36 is revolved by means of its serrated outer periphery, it will be held in definite alignment by the disc 36 engaged within the slot 35, and will cause the adaptor 22 supporting the slide frame 24 to be moved either forward or rearward towards or away from the lenses 18 and 18' mounted within the front wall 16.

The ferrule 37 is hollow as stated above to receive a lamp shown as 40 which is inserted into a receptacle or socket 41, and is mounted on a support member 42 which is constructed of non-conducting material forming an adaptor to be held in position as shown as 23 in Figure 4. The socket 41 has a contact member 44 attached thereto, and the lamp 40 has a similar contact member 45 in which it is in contact, and these two leads or contact members 44 and 45 respectively extend on both sides of the support member 42 as is plainly shown in Figure 6, and are supported by the member 42 at 46 by means of a non-conducting rivet or the like.

There are resilient contact members shown as 47 and 47' attached to the walls 21 at 48, and having outwardly extending resilient members 49 and 49' forming a part thereof.

The dry cells or batteries 34, rest on the flanges 33 which are arcuate in contour, and by referring to Figure 9, it will be noted that the contact 50 of one of the batteries contacts the member 44 leading to the socket 41, while the other battery contact 50, contacts the member 49' connected and forming a part of the member 47'. The flat end of one of the dry cells contacts the member 45 leading to the lamp 40, and the other battery 34 has its flat portion contacting the member 49 forming a part of the member 47.

Obviously, when in position, the members 47 and 47' extend from the wall 21, over the dry cells 34 as shown in Figure 4, and when pressure is exerted on the hinge portion 13 of the upper part of the case, it will cause the plate shown as 15 to engage both of the members 47 and 47' thereby completing the circuit and causing the lamp 40 to ignite within the adaptor 42 behind the stereoscopic slide frame 24, and the reflector 28 will reflect the light through the transparent picture within the slide 24. Obviously, if the entire hinged portion 13 is made of metal, it will eliminate the plate shown as 15 to complete the circuit.

By revolving the disc 36, the adaptor 22 carrying the frame 24, will be caused to move toward and away from the lenses 18 and 18', thereby focusing the picture to its proper position.

The device constructed as described may be manipulated with one hand by the operator. That is the focusing operation and the operation of the switch can be done with one hand, while the operator employs the other hand to insert and remove the slide frames bearing the pictures.

In the chosen embodiments of my invention exemplified by the accompanying drawings, there are present certain novel refinements and improvments not heretofore disclosed in the prior art which will be hereafter more fully referred to and specifically pointed out in the appended claims.

Having thus described my invention, what I claim and desire to secure by Letters Patent in the United States is:

1. A stereoscopic viewer comprising an enclosure having lenses mounted in one of its walls, a slot extending through the top of said enclosure in parallel relation to said lenses, an adapter slidably mounted within said enclosure, said adaptor equipped with a front wall having apertures therethrough, and a rear wall acting as a reflector, a slot disposed through the top of said adaptor, the slot in said adaptor underlying the slot in the enclosure top for receiving a slide inserted through the top of the enclosure, means for slidably moving said adaptor within said enclosure toward and away from said lenses to adjust the focus, said slot in the enclosure top being wide enough to allow a slide to be inserted in the adaptor slot in any focal position of the adaptor, illuminating means disposed within said adaptor between the front and rear walls thereof, a source of electric energy and means for controlling the electric current for said illuminating means.

2. A viewer of the character described comprising, an elongated enclosure consisting of a top, a bottom and four side walls, said top having a portion hingedly attached thereto, lenses mounted into one of the walls, a slot disposed transversely through the top, a vertical partition disposed within said enclosure thereby forming a front and rear compartment within said enclosure, a lamp, a socket, said lamp engaging said socket, a support for said socket, said support mounted within the rear compartment, said partition equipped with an aperture centrally disposed therethrough to accommodate the lamp mounted on said support, a stereoscopic slide adaptor, said adaptor slidably mounted within the front compartment of said enclosure, said adaptor equipped with a longitudinal slot through its top, the slot at the top of said enclosure being wider than the slot at the top of said adaptor and in direct alignment therewith, means extending through the top of said enclosure for slidably moving said adaptor within said front compartment toward and away from said lenses, said adaptor having a forward wall provided with a pair of apertures and a rearward wall acting as a reflector, said reflector wall provided with an aperture to permit the lamp on said support to extend therethrough onto said reflector, a source of electric current within said rear compartment, and contact means within the electric lamp circuit, said contact means adapted to be actuated by the hinged portion forming a part of the top of said enclosure.

3. A viewer of the character described comprising an enclosure consisting of, a top, a bottom and four walls, a pair of lenses mounted into the forward wall of said enclosure, said enclosure provided with a partition separating said enclosure into a forward and rearward compartment, a lamp, a socket for supporting said lamp, a socket support, said support removably mounted within the rearward compartment of said enclosure, said partition having an aperture therethrough, said lamp extending through said aperture, an adaptor slidably mounted within said forward compartment, said adaptor having a forward wall equipped with apertures, a rearward wall acting as a reflector, said reflector having an aperture for receiving the lamp extending through said partition, means for moving said adaptor toward and away from said lenses, in the front wall of said enclosure, an elongated slot in the top of said adaptor in parallel relation to the front wall thereof, an elongated slot in the top of said forward compartment of said enclosure, said slot being wider than the slot in said adaptor and in direct alignment therewith, a source of electric energy connecting said lamp and socket, and a resilient means forming a part of the top of said enclosure for completing the circuit for energizing said lamp by means of said electric energy.

4. A viewer comprising, an enclosure having a fixed lens board, a lens fixed in said lens board, a slot in the top of the enclosure substantially perpendicular to the axis of said lens and adapted to admit a slide to the interior of the enclosure, a carriage slidably mounted within the enclosure and including a front wall having an aperture therethru in alignment with said lens and a top wall provided with a slot adapted to underlie the slot in the enclosure top, means for moving said carriage to and from the lens to adjust the focus, the width of the slot in the carriage being sufficient to receive said slide mount and the width of the slot in the enclosure top being sufficient to allow a slide to be inserted into said carriage slot in any adjusted position of the carriage, and means for illuminating the slides from the side opposite the lens.

5. A viewer according to claim 4 in which said cariage includes a reflector adapted for movement with the carriage and the illuminating means is located between the front wall of the carriage and the reflector.

HARRY J. COLLINS.

References Cited in the file of this patent
UNITED STATES PATENTS

| Number | Name | Date |
|---|---|---|
| 672,609 | Young | Apr. 23, 1901 |
| 2,182,514 | Ciechanow | Dec. 5, 1939 |
| 2,336,288 | Peterson | Dec. 7, 1943 |
| 2,349,013 | Sparling | May 16, 1944 |
| 2,484,591 | Rochwite | Oct. 11, 1949 |
| 2,517,170 | Bernard | Aug. 1, 1950 |
| 2,581,000 | Copeland | Jan. 1, 1952 |